(12) United States Patent
Knost et al.

(10) Patent No.: US 12,219,962 B2
(45) Date of Patent: Feb. 11, 2025

(54) ONCE-THROUGH BAKING OVEN FOR CONTINUOUS BAKING OPERATION

(71) Applicant: Werner & Pfleiderer Industrielle Backtechnik GmbH, Tamm (DE)

(72) Inventors: Dieter Knost, Dinkelsbühl (DE); Ulrich Speck, Ludwigsburg (DE)

(73) Assignee: Werner & Pfleiderer Industrielle Backtechnik GmbH, Tamm (DE)

( * ) Notice: Subject to any disclaimer, the term of this patent is extended or adjusted under 35 U.S.C. 154(b) by 395 days.

(21) Appl. No.: 17/638,245

(22) PCT Filed: Jul. 21, 2020

(86) PCT No.: PCT/EP2020/070569
§ 371 (c)(1),
(2) Date: Feb. 25, 2022

(87) PCT Pub. No.: WO2021/037444
PCT Pub. Date: Mar. 4, 2021

(65) Prior Publication Data
US 2022/0287314 A1    Sep. 15, 2022

(30) Foreign Application Priority Data
Aug. 28, 2019  (DE) ............ 10 2019 212 937.4

(51) Int. Cl.
*A21B 1/10* (2006.01)
*A21B 1/48* (2006.01)

(52) U.S. Cl.
CPC . *A21B 1/10* (2013.01); *A21B 1/48* (2013.01)

(58) Field of Classification Search
CPC .... A21B 1/02; A21B 1/06; A21B 1/10; A21B 1/48; A21B 1/40; A21B 1/24; A21B 1/28; F28D 1/0472; F28D 7/04
See application file for complete search history.

(56) References Cited

U.S. PATENT DOCUMENTS

| 1,832,374 A |   | 11/1931 | Theodore et al. |
| 3,548,514 A | * | 12/1970 | Smith ............ A21B 1/02 34/232 |

(Continued)

FOREIGN PATENT DOCUMENTS

| DE | 1095223 B  | 12/1960 |
| DE | 2629716 A1 | 1/1977  |

(Continued)

*Primary Examiner* — Ko-Wei Lin
(74) *Attorney, Agent, or Firm* — Smartpat PLC

(57) ABSTRACT

A once-through baking oven has a plurality of oven modules which together form a once-through baking space. A heat-exchange heating device for indirect heating of the once-through baking space has a heating medium outward-flow pipe arrangement, a heating medium return-flow pipe arrangement and at least one intermediate radiator pipe arrangement having a plurality of heat exchanger pipes The heating medium flows in two adjacent heat exchanger pipes in opposite flow directions to each other. In an alternative embodiment of the radiator pipe arrangement, it runs in a spiral or meander shape in such a way that the heating medium flows in two adjacent pipe sections in opposite flow directions to each other. This results in a once-through baking oven that can be operated efficiently and adapted to different throughput requirements.

9 Claims, 7 Drawing Sheets

(56) References Cited

U.S. PATENT DOCUMENTS

| | | | | |
|---|---|---|---|---|
| 6,909,069 B2* | 6/2005 | Kerler | ............... | A21B 1/40 |
| | | | | 219/400 |
| 2015/0053373 A1* | 2/2015 | Heung | ............ | F28D 7/0016 |
| | | | | 165/61 |
| 2019/0376751 A1* | 12/2019 | Speck | ............... | F28D 7/087 |
| 2020/0221899 A1* | 7/2020 | Dees | ............... | F24H 1/162 |

FOREIGN PATENT DOCUMENTS

| | | | | |
|---|---|---|---|---|
| DE | 19820061 A1 | 12/1998 | | |
| EP | 1729584 B1 | 10/2009 | | |
| WO | WO-8203681 A1 * | 4/1982 | | |
| WO | 3203681 A1 | 10/1982 | | |
| WO | WO-2019042851 A1 * | 3/2019 | ............ | A47J 31/46 |

* cited by examiner

ONCE-THROUGH BAKING OVEN FOR CONTINUOUS BAKING OPERATION

CROSS-REFERENCES TO RELATED APPLICATIONS

This application claims the priority of German Patent Application, Serial No. DE 10 2019 212 937.4, filed Aug. 28, 2019, the content of which is incorporated herein by reference in its entirety as if fully set forth herein.

FIELD OF THE INVENTION

The invention relates to a once-through baking oven for continuous baking operation.

BACKGROUND OF THE INVENTION

Such a once-through baking oven is known from DE 1 095 223 A, DE 26 29 716 A1 and U.S. Pat. No. 1,832,374. DE 198 20 061 A1 describes a baking oven with a plurality of oven modules arranged one behind the other, each having a plurality of stoves arranged one above the other.

SUMMARY OF THE INVENTION

It is an object of the present invention to further develop a once-through baking oven of the type mentioned above in such a way that it can be operated efficiently and adapted to different throughput requirements.

This object is achieved according to the invention by a once-through baking oven for the continuous baking operation
having a once-through baking space,
having a plurality of oven modules with module baking space sections which together form the once-through baking space between an initial baking oven module leading in the baking material conveying direction and a final oven module in the baking material conveying direction,
having a baking material conveying device for continuously conveying baking material between the initial oven module and the final oven module in the baking material conveying direction,
having a heat-exchange heating device for indirect heating of the once-through baking space via a free-flowing heating medium, wherein the heat-exchange heating device has:
a heating medium outward-flow pipe arrangement,
a heating medium return-flow pipe arrangement, and
at least one intermediate radiator pipe arrangement with a plurality of heat exchanger pipes running side by side for indirect heat dissipation to the baking space, wherein the heat exchanger pipes each guide the heating medium between the heating medium outward-flow pipe arrangement and the heating medium return-flow pipe arrangement,
wherein the pipe arrangements are designed in such a way that the heating medium in two adjacent heat exchanger pipes flows in opposite flow directions to each other.

According to the invention, it has been found that a heat-exchange heating device with a heat-exchange heating device with adjacent heat-exchange pipes in which the heating medium flows in opposite flow directions to each other leads to the possibility of equalizing a heat output of the radiator pipe arrangement, to which these heat exchanger pipes belong, towards the baking space. This improves the baking result and enables the specification of a uniform temperature zone via the associated radiator pipe arrangement. This "counter-current" arrangement of the heat exchanger pipes thus equalizes the heat radiation over an area of the radiator pipe arrangement, which in particular can be as large as desired. A temperature distribution over a width of the baking space and/or over a length of the baking space can be equalized. A temperature distribution on the radiation or radiator surfaces of the once-through baking oven can be optimized, i.e. it can be adapted to a specified temperature distribution.

A pipe cross-section of the heat exchanger pipes can be round, but can also deviate from a round shape in sections or as a whole. The heat exchanger pipes can be designed as hollow profiles of any geometry, for example with a square, rectangular, trapezoidal or polygonal cross-section.

If heating gas is used as the heating medium, a lower overall heating gas temperature can be used to achieve a specified baking result. This reduces the emission of pollutants via an exhaust gas stack of the once-through baking oven. Overall, a lower exhaust gas temperature is possible and energy can be saved by reducing energy losses via the stack.

An extension of a heating medium path through the heat exchanger pipes between the outward-flow pipe arrangement and the return-flow pipe arrangement is not required to create this "counterflow" arrangement.

Depending on the embodiment, the once-through baking oven can also have a plurality of once-through baking spaces, possibly arranged one above the other.

The heat-exchange heating device is used for indirect heating without the heating medium coming into contact with the baking material. The heat-exchange heating device heats at least one module baking space section. Alternatively, the heat-exchange heating device can also heat a plurality of or all module baking space sections, i.e. in particular the entire once-through baking space. Exactly one heat-exchange heating device can be provided per oven module. Alternatively, it is possible to provide certain oven modules without a heat-exchange heating device or with a plurality of heat-exchange heating devices. The heating medium can be a heating gas.

In addition, at least one surface of the heat-exchange heating device, heated via the heating medium, may be coated with an absorber material which reemits thermal radiation in a preferred wavelength range. A primary heat source for heating the heating medium may be a heating gas burner. Alternatively or additionally, a heat source may be used which emits heat to the baking space atmosphere and/or to the heating medium via an external heat exchanger. Such a heat source may have a burner, a fan and a heat exchanger. Such a heat source can be used as an external energy block, in particular for heating the baking space atmosphere.

In a radiator pipe arrangement designed in such a way that the heating medium flows through all heat exchanger pipes in alternating directions in each case, the advantages of the "counterflow" arrangement described above are particularly effective. A complete counterflow arrangement—viewed transversely to the longitudinal extension of the heat exchanger pipes—can then be realized with alternating flow direction of the heating medium through the heat exchanger pipes.

A design of the heat exchanger pipes in which the heat exchanger pipes of the respective radiator pipe arrangement are designed as a pipe package with pipes of the same length enables a cost-efficient production of corresponding pipe packages. The lengths of the heat exchanger pipes within such a pipe package do not have to be exactly the same, but can differ slightly from each other due to connection requirements for outward-flow or return-flow lines. It is sufficient, for example, if the lengths of the heat exchanger pipes of the respective radiator pipe arrangement do not differ by more than 10%.

A main line/stub pipe arrangement in which the heating medium outward-flow pipe arrangement and/or the heating medium return-flow pipe arrangement have a main line from which stubs extend to the heat exchanger pipes, wherein the main line extends parallel to a longitudinal extension of the heat exchanger pipes of the radiator pipe arrangement enables a compact structure of the heat-exchange heating device.

The same applies to an arrangement in which the heating medium outward-flow pipe arrangement and/or the heating medium return-flow pipe arrangement each have two stubs which run transversely to the longitudinal extension of the heat exchanger pipes and are in fluid communication with spatially opposite ends of the heat exchanger pipes of the radiator pipe arrangement.

Designs of the radiator pipe arrangements of the heat-exchange heating device as a top heat arrangement and/or as a bottom heat arrangement have proven themselves in practice. A distribution of the heating medium between the top heat arrangement and the bottom heat arrangement can be ensured by means of corresponding butterfly valves in the outward-flow or return-flow pipe arrangements so that a bottom heat arrangement and an associated top heat arrangement can be part of a common heat-exchange heating device. Alternatively or additionally, the top heat arrangement on the one hand and the bottom heat arrangement on the other hand can be controlled independently of each other with regard to their heating power and/or can be heated independently of each other.

The object mentioned at the beginning is further solved according to the invention by a once-through baking oven for the continuous baking operation
  having a once-through baking space,
  having a plurality of oven modules with module baking space sections which together form the once-through baking space between an initial baking oven module leading in the baking material conveying direction and a final oven module in the baking material conveying direction,
  having a baking material conveying device for continuously conveying baking material between the initial baking oven module and the final oven module in the baking material conveying direction,
  having a heat-exchange heating device for indirect heating of the once-through baking space via a free-flowing heating medium,
  wherein the heat-exchange heating device has:
    a heating medium outward-flow pipe section,
    a heating medium return-flow pipe section, and
    at least one intermediate radiator pipe arrangement with
      a pipe section for guiding the heating medium between the heating medium outward-flow pipe section and the heating medium return-flow pipe section and for indirect heat dissipation to the baking space,
  wherein a course of the radiator pipe arrangement is spiral and/or meander-shaped such that the heating medium in two adjacent heat exchanger pipe sections flows in opposite flow directions to each other.

With a spiral or meander-shaped radiator pipe arrangement, there is also the possibility of a heating medium temperature progression in such a way that as a result the heat radiation is as uniform as possible over the surface of the radiator pipe arrangement. The radiator pipe arrangement is also compact.

The variants described above for the once-through baking oven with "counterflow" arrangement of heat exchanger pipes and with spiral or meander-shaped course of the radiator pipe arrangement can also be installed in combination in a once-through baking oven and belong, for example, to different heat-exchange heating devices of the once-through baking oven.

A convection heating device for direct heating of the once-through baking space via a heating gas,
  wherein the convection heating device has:
    a heating gas outward-flow pipe arrangement,
    a heating gas return-flow pipe arrangement, and
    at least one intermediate convection heating gas pipe arrangement with a plurality of convection heating gas pipes running side by side, via each of which the heating gas flows directly into the baking space
enables additional direct heating of the baking space. The direct heating can take place via convection and/or via gas flow driven by means of at least one fan, for example a heating gas circuit. In an alternative once-through baking oven, such direct heating can also be carried out exclusively. In this case, the heat-exchange heating device described above is not required.

An arrangement of the heat exchanger pipes in which the heat exchanger pipes of the heat-exchange heating device and the convection heating gas pipes of the convection heating device are accommodated alternately in a pipe package leads to a particularly good uniformity of a baking space heating. The convection heating gas pipe arrangements can also be designed as top heat or bottom heat arrangements. In this context, what has already been explained above applies.

Passage openings on the shell side for guiding the heating gas into the baking oven have proven themselves for the realization of a covective heating or a direct heating.

The heat-exchange heating device and the convection heating device or a direct heating via gas flow driven by means of a fan can be controlled or regulated via a control/regulating device. For regular operation, the once-through baking oven can have at least one temperature sensor for detecting a defined temperature, in particular a baking space temperature. If a regulated heating operation is to take place over several (temperature) zones of the once-through baking space, a temperature sensor can be provided in each of the zones so that independent regulated operation is possible in the various temperature zones. One such temperature sensor can be provided per heat-exchange heating device and/or per convection heating device and/or per bottom and top heat.

Examples of embodiments of the invention are explained below with reference to the drawings.

DESCRIPTION OF THE PREFERRED EMBODIMENTS

Figure 1:
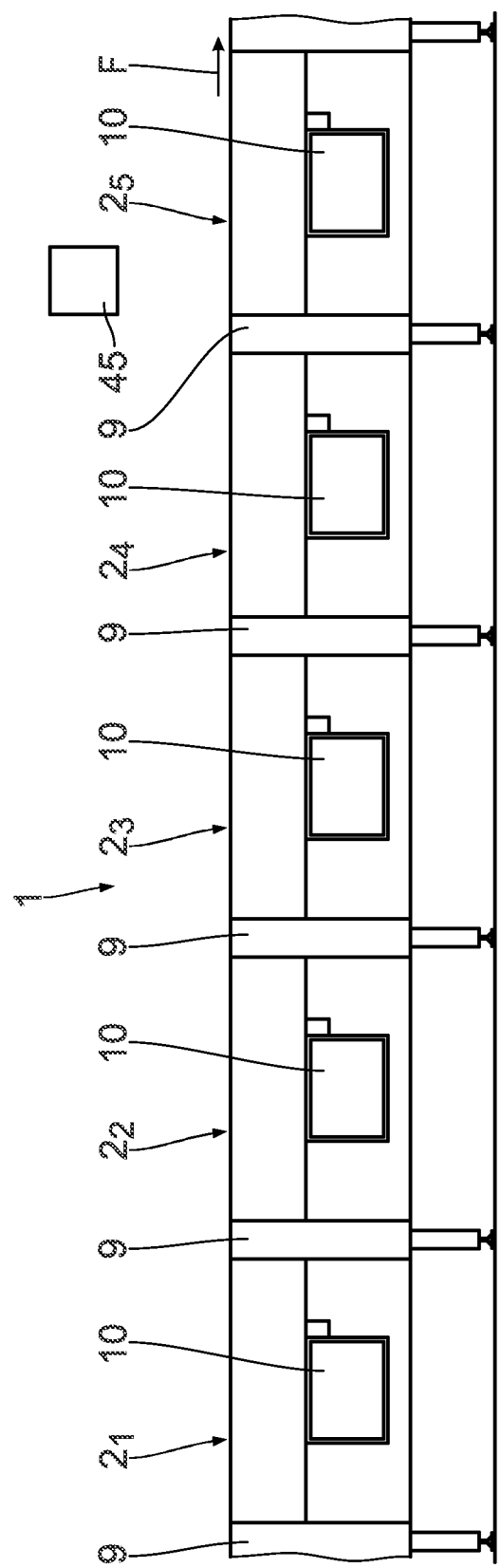
FIG. 1 shows a side view of a modular once-through baking oven.

FIG. 1 shows a total side view of a once-through baking oven 1 in the form of a tunnel oven, which can be used, for example, to produce long-life pastries in the form of soft biscuits, hard biscuits or pretzel products. Other bakery goods, e.g. toast bread, can also be processed in the baking oven. The baking oven 1 can also be used for roasting and, as a special application, for drying or sterilizing. The baking oven 1 is shown interrupted in the embodiment shown and has a plurality of oven modules 2 with baking spaces which together form a once-through baking space 3 between in each case an initial baking oven module $2_1$ leading in the baking material conveying direction F and in each case a final oven module $2_N$ in the baker product conveying direction (i=1, ..., N, N: number of oven modules). FIG. 1 shows a total of five oven modules $2_1$ to $2_5$. The oven modules are thus arranged on one level in the once-through baking oven 1. The number N of oven modules $2_i$ can vary in practice, for example, between 5 and 20.

The oven modules $2_i$ each have the same basic structure, in particular with regard to a supporting frame design and receptacles for add-on and built-in components. In this respect, the oven modules $2_5$ have the same dimensions, i.e. basically have the same installation space requirements in terms of height, width and depth.

A typical length of one of the oven modules 2 in the baking material conveying direction F is more than 2 m and less than 10 m and can be, for example, in the range of 3 m to 6 m. For example, the length of an oven module $2_i$ can be 4.5 m, 6 m or 7.5 m.

A working width of the once-through baking space 3 can be greater than 1 m and can be up to 4 m.

The once-through baking oven 3 can have an overall length along the baking material conveying direction F in the range between 8 m and 80 m, in particular in the range between 12 m and 60 m.

A clear height of the once-through baking space 3 can be greater than 200 mm and can be less than 300 mm.

The oven modules $2_i$ are initially present as separate modules and are joined together when the oven 1 is assembled.

Figure 2:
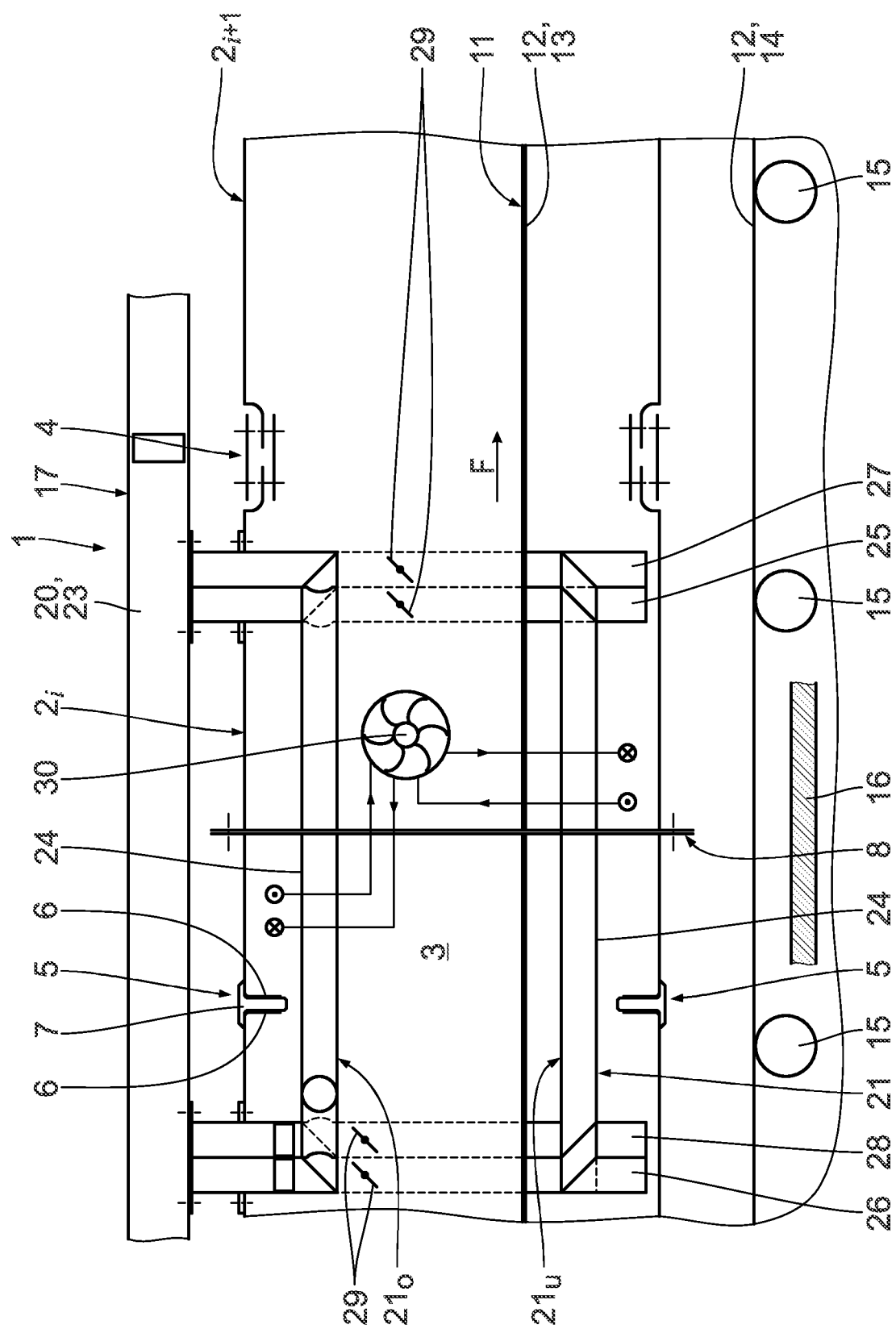
FIG. 2 schematically shows a longitudinal vertical section through a section of the once-through baking oven, showing details of a baking material conveying device and a heating device including a heat-exchange heating device and a heating device for direct heating of a once-through baking space via a heating gas.

FIG. 2 shows a possible connection technique of two oven modules $2_i$, $2_{i+1}$ via a sliding joint 4, which is known from EP 1 729 584 B. The sliding joint 4 provides for a compensation of the material expansion of module housing elements depending on their temperature. For further temperature expansion compensation, FIG. 2 shows a welded joint 5 running around the oven module $2_i$ with circumferentially folded housing edge regions 6 and an inserted T-profile 7, which is welded circumferentially around the oven module $2_i$ with the folded housing edge regions 6.

Housing elements of the respective oven modules $2_N$ can furthermore be connected to each other via screw joint connections in the manner of flanges.

The oven modules $2_i$ are supported by a machine floor.

A feeding module 9 for the baking material is arranged in front of an initial baking oven module $2_1$ leading in each case in the baking material conveying direction, which feeding module 9 communicates with the oncethrough baking space 3. Behind a final oven module $2_N$ in the baking material conveying direction, there is a discharge or final module of the once-through baking oven 1, which is not shown in the drawing, for taking over the baked baking material from the once-through baking space 3 and for discharging them, which in turn communicates with the once-through baking space 3.

Baking material to be baked enter the once-through baking space 3, i.e. the leading initial baking oven module $2_1$, via the feeding module 9, passes through the once-through baking space 3 along the baking material conveying direction F and exits the once-through baking space 3 completely baked via the discharge module after having passed through the last final oven module $2_i$.

In the side view of the once-through baking oven according to FIG. 1, cleaning and inspection openings 10 are also provided in the oven modules $2_i$. Furthermore, an additional steam opening can be provided laterally in the oven modules $2_i$, via which it is possible to inject/remove steam into/from the respective partial baking space of the associated oven module $2_i$.

A baking material conveying device 11 with an endlessly circulating baking belt 12 is used to convey the baking material in the baking material conveying direction F. An upper run 13 of the baking belt 12 runs through the once-through baking space 3. A lower run 14 of the baking belt 12 runs through below a baking space housing of the oven module $2_i$.

The baking belt can be a mesh made of metal. This mesh can include pipe elements running transversely to the conveying direction F. A non-metallic material is also possible for the baking belt 12. The baking belt 12 can be tensioned by means of a conventional tensioning device having a displaceable tensioning roller. The lower run 14 can be supported by rollers 15, as shown in FIG. 2, and/or by sliding elements. Underneath the lower run 14, prefabricated panels may be inserted which are designed to be removable from a housing of the once-through baking oven 1 for cleaning the return run. Below the lower run 14, the oven modules $2_i$ are thermally insulated by means of thermal insulation panels 16. Stuffed mineral wool can also be used for thermal insulation.

The baking material conveying device 11 serves for continuous conveyance of the baking material between the initial oven module $2_1$ and the final oven module $2_N$ of the once-through baking oven 1.

The baking belt 12 is designed for a belt load in the range between 10 kg per square meter and 100 kg per square meter, particularly in the range between 30 kg per square meter and 80 kg per square meter.

The baking belt 12 can be designed as a steel strap, as a belt on pipes or also as a mesh band.

A rotary drive of the baking belt 12 for moving the upper run 13 in the baking product conveying direction 11 can be effected via a drive of the baking product conveying device 11, which is not shown and which interacts with the baking belt 12 via positive locking. An endless traction means, for example a chain, can be used for this purpose.

The belt tension can be hydraulically actuated. A positioning/speed regulation of the baking belt can be carried out with the aid of an optical or capacitive sensor system, in particular without contact. For this purpose, a position sensor (not shown) can encompass a lateral edge region of the baking belt in a U-shape.

The once-through baking oven 1 may have a preheater for the baking belt 12.

The once-through baking oven 1 has a heat-exchange heating device 17, embodiment variants of which are explained below with reference to FIGS. 2 to 6. The heat-exchange heating device 17 serves for indirect heating of the once-through baking space 3 via a free-flowing heating medium. The heating medium can be heating gas.

Figure 3:
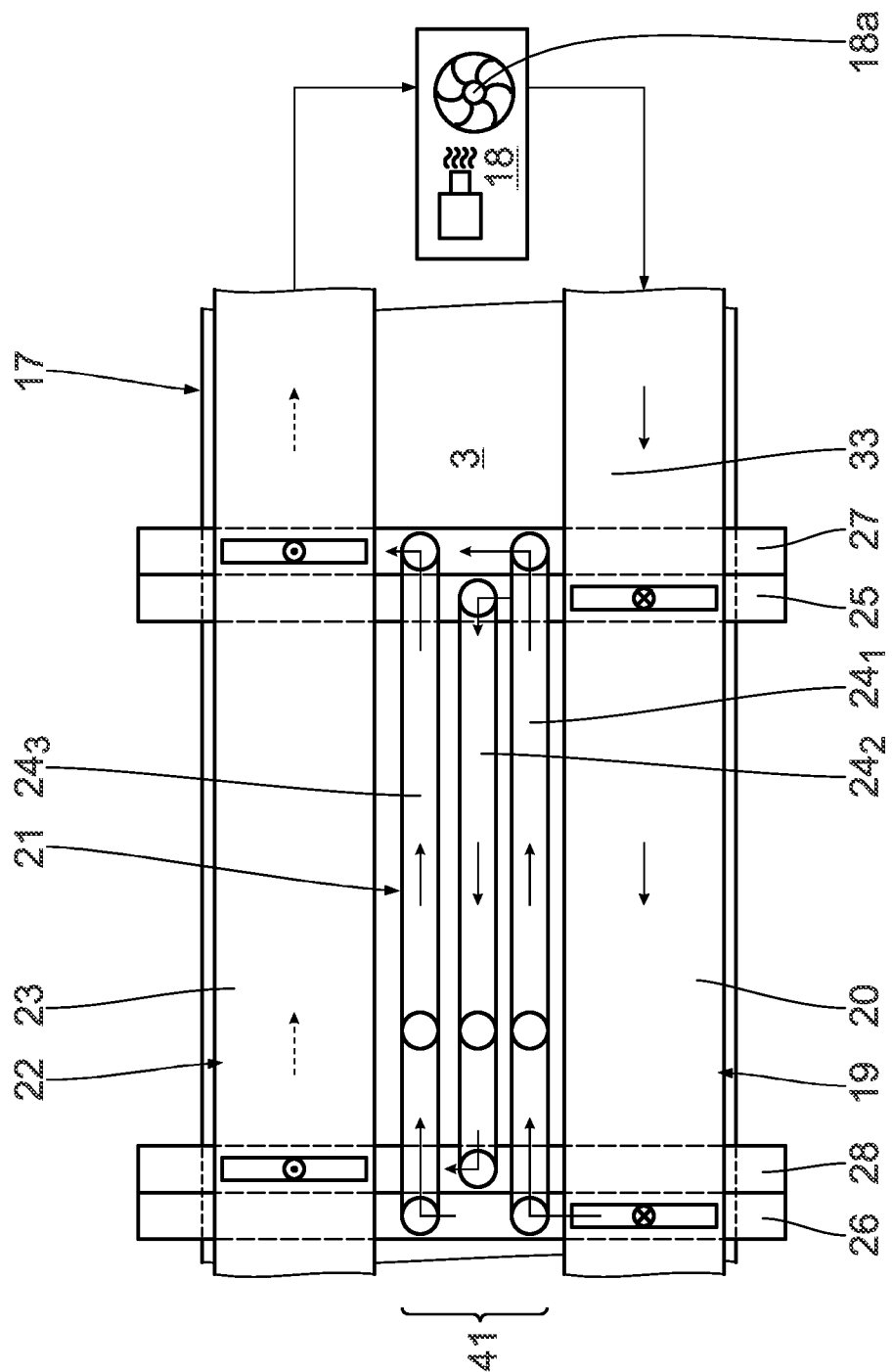
FIG. 3 similarly abstract as in FIG. 2, shows a longitudinal horizontal section through a section of the oncethrough baking oven according to FIG. 1, wherein details for guiding a heating medium in the heat-exchange heating device can be seen.
Figure 4:
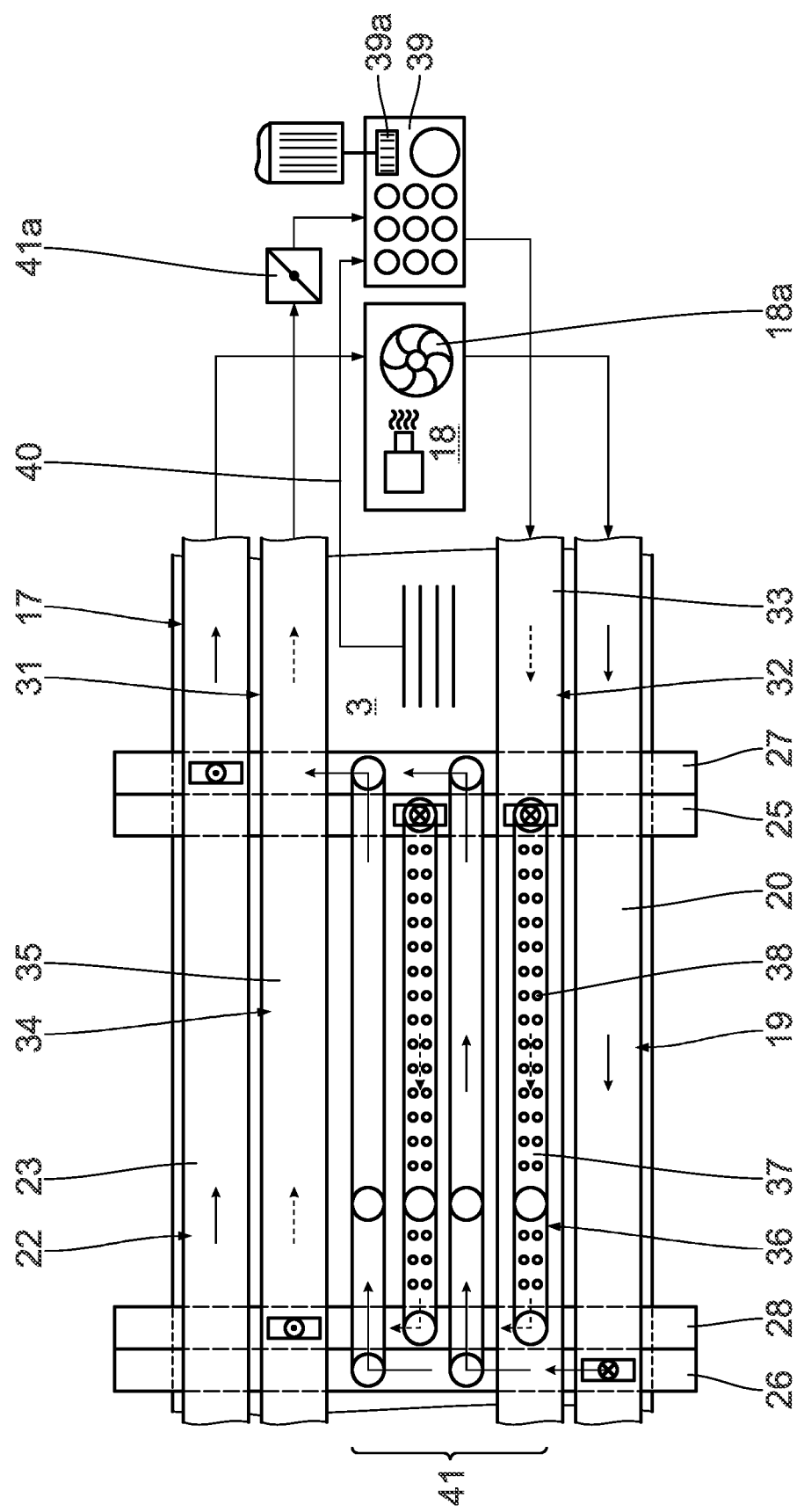
FIG. 4 in a similar representation to FIG. 3, shows a variant of a heating device for the once-through baking oven, having a heat-exchange heating device similar to that of FIG. 3 as well as a convection heating device for direct heating of the once-through baking space via a heating gas.

The main components of the heat exchange heating device 17 are a heating unit 18 for the heating medium, which in the embodiments according to FIGS. 3 and 4 is designed as a heating gas burner, a heating medium outward-flow pipe arrangement 19 with an outward-flow main line 20, at least one radiator pipe arrangement 21 for radiant heating of the once-through baking space 3 and a heating medium return-flow pipe arrangement 22 with a return-flow main line 23 for the heating medium. The heating unit 18, the heating medium outward-flow pipe arrangement 19, the radiator pipe arrangement 21 and the heating medium return-flow pipe arrangement 22 constitute a closed heating gas circuit.

The heat-exchange heating device 17 of the once-through baking oven can be designed in such a way that exactly one such heat-exchange heating device 17 is provided for each oven module $2_i$. The number of heat-exchange heating devices 17 may also be different from the number of oven modules $2_i$. For example, it is possible to design certain oven modules $2_i$ without a heat-exchange heating device 17. It is also possible to design a heat-exchange heating device 17 for a plurality of adjacent oven modules $2_i, 2_{i+1}, \ldots$. Finally, it is possible to equip an oven module $2_i$ with a plurality of heat-exchange heating devices 17.

A heating zone regulation, i.e. a baking space temperature progression along the baking product conveying direction F, can take place via a respective temperature regulation of the various heat-exchange heating devices 17 by regulated controlling of the respective heating units 18. Each regulation zone along the baking product conveying direction F in the once-through baking space 3 has its own, independently controllable heating unit 18.

The radiator pipe arrangements 21 of the heat-exchange heating device 17 can be designed as top heat/bottom heat arrangements in relation to the once-through baking space 3. FIG. 2 shows a variant of the heat-exchange heating device 17 in which both a top heat arrangement $21_o$ and a bottom heat arrangement $21_u$ of the radiator pipe arrangement 21 are present in the oven module $2_i$.

The respective radiator pipe arrangement 21 has a plurality of heat exchanger pipes $24i$ running side by side for indirect heat dissipation to the baking space 3, which each guide the heating medium between the heating medium outward-flow pipe arrangement 19 and the heating medium return-flow pipe arrangement 22. The heat exchanger pipes $24_i$ of the respective radiator pipe arrangement 21 are designed as a pipe package with pipes $24_i$ of the same length or essentially the same length.

Figure 5:
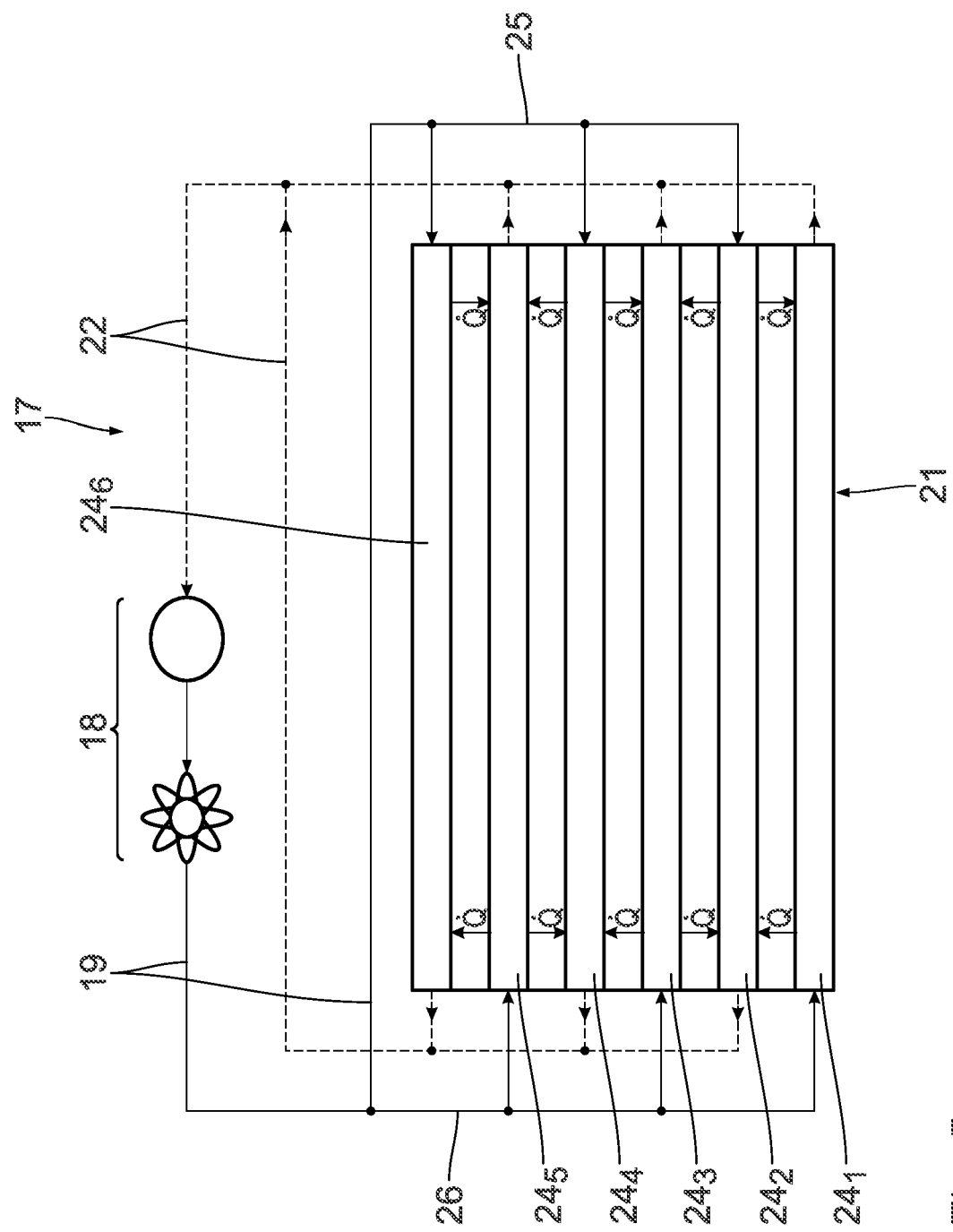
FIG. 5 schematically shows a heating medium guide through a variant of a heat-exchange heating device for the once-through baking oven with a radiator pipe arrangement designed as a pipe package, which is designed in such a way that the heating medium flows in opposite flow directions in each of two adjacent heat exchanger pipes.

The radiator pipe arrangement 21 consisting of the heat exchanger pipes $24_i$ running side by side is arranged in a horizontally extending plane which is perpendicular to the drawing plane of FIG. 2 and parallel to the drawing planes of FIGS. 3 to 5.

In the case of the heating gas routing of the heat-exchange heating device 17 according to FIG. 3, the outward-flow main line 20 on the one hand and the return-flow main line 23 on the other hand run parallel to a longitudinal extension of the heat exchanger pipes 24 of the respective radiator pipe arrangement 21. This running direction is also parallel to the conveying direction F. Alternatively, it is possible to run the main lines 20, 23 or the heat exchanger pipes 24 transversely to the baking material conveying direction F.

Outward-flow stubs 25, 26, which are each designed as annular ducts, run from the outward-flow main line 20 to the heat exchanger pipes 24. The outward-flow stubs 25, 26 each run in a plane to which the longitudinal extension of the heat exchanger pipes 24 is perpendicular, i.e. they run transversely to the longitudinal extension of the heat exchanger pipes 24.

The outward-flow stubs 25, 26 are in fluid communication with spatially opposite ends of in each case alternating successive heat exchanger pipes $24_i$, $24_{i+1}$ of the radiator pipe arrangement 21. In the embodiment according to FIG. 3, the outward-flow stub 25 is in fluid communication with the middle heat exchanger pipe $24_2$ at the right-hand end of this heat exchanger pipe $24_2$ in FIG. 3. The other outward-flow stub 26 is in fluid communication with the other two heat exchanger pipes $24_1$ and $24_3$ of the radiator pipe arrangement 21. This results in the heating medium being guided through the radiator pipe arrangement 21 in such a way that the heating medium flows in two adjacent heat exchanger pipes $24_i$, $24_{i+1}$ in opposite flow directions to each other. In the embodiment according to FIG. 3, the heating medium flows from left to right in the heat exchanger pipes $24_1$, $24_3$ and from right to left in the intermediate heat exchanger pipe $24_2$. In the embodiment according to FIG. 3, the radiator pipe arrangement 21 is designed in such a way that the heating medium thus flows through all heat exchanger pipes $24_i$ in alternating directions. A resulting "counterflow" arrangement is such that a path of the heating medium through the heat exchanger pipes $24_i$ between the heating medium outward-flow pipe arrangement 19 and the heating medium return-flow pipe arrangement 22 is not longer than if the heating medium were to flow through all heat exchanger pipes $24_i$ in the same flow, i.e. in the same direction in each case.

Schematically, such a design of the pipe arrangements 19, 21 and 22 resulting in a corresponding alternating heating medium flow through the heat exchanger pipes $24_i$ is shown in FIG. 5. Components and functions corresponding to those already explained above with reference to FIGS. 1 to 4 and in particular with reference to FIGS. 2 and 3 bear the same reference numbers and will not be discussed in detail again.

In FIG. 5 the heat exchanger pipes $24_1$ to $24_6$ are numbered from bottom to top as far as their index is concerned. The heating medium flows via the heating unit 18 and the outward-flow pipe arrangement 19 into the outward-flow stubs 25, 26, which in turn are in fluid communication with spatially opposite ends of the heat exchanger pipes of the radiator pipe arrangement 21. Along the flow direction through the heat exchanger pipes $24_i$, there is a temperature gradient of the heating medium, which is hottest when it enters the respective heat exchanger pipe 24 and cools down in the further course of flow through the heat exchanger pipe 24 due to the heat dissipation into the once-through baking space 3.

This results in the alternating heating medium flow, in which the heating medium flows through the heat exchanger pipes $24_1$, $24_3$ and $24_5$ in FIG. 5 from left to right and through the heat exchanger pipes $24_2$, $24_4$ and $24_6$ in FIG. 5 from right to left. Due to this "counterflow" arrangement, there is a uniformity of heat radiation over the entire surface of the radiator pipe arrangement 21 towards the baking space, i.e. in the direction perpendicular to the drawing plane of FIG. 5. A heat transport flowing during this uniformity between hotter ends of the heat exchanger pipes $24_i$ and intermediate less hot ends of the heat exchanger pipes $24_{i-1}$, $24_{i+1}$ is illustrated in FIG. 5 by arrows indicating the heat flow $\delta Q/\delta t$.

In the following, the course of the heating medium through the heating medium return-flow pipe arrangement 22 is first described with reference to FIG. 3. The return-flow main line 23 is in fluid communication with spatially opposite ends of the heat exchanger pipes 24 of the respective radiator pipe arrangement 21 via return-flow stubs 27, 28, which in turn are designed as annular ducts comparable to the outward-flow stubs 25, 26. The heating medium flowing into the heat exchanger pipe $24_2$ from the right via the outward-flow stub 25 flows out of the heat exchanger pipe $24_2$ via the return-flow stub 28 back into the return-flow main line 23. The heating medium flowing from the left via the outward-flow stub 26 into the heat exchanger pipes $24_1$, $24_3$ to the right flows out again via the return-flow stub 27 into the return-flow main line 23.

A relative top heat/bottom heat output can be specified via throttle elements, for example in the form of throttle valves 29, in the stubs 25 to 28, which are shown in FIG. 2.

The air in the baking space heated by the heat-exchange heating device 17 can be circulated by a circulation fan 30.

The once-through baking space 3 can also be heated via a convection heating device 31 for direct heating of the once-through baking space 3 via a heating gas. Such a convection heating device 31 is explained below with reference to FIG. 4, which shows such a convection heating device 31 in addition to the heat-exchange heating device 17 already explained.

The convection heating device 31 has a heating gas outward-flow pipe arrangement 32 with a heating gas outward-flow main pipe 33, which runs parallel to the heating medium outward-flow main line 20 of the heat-exchange heating device 17. Furthermore, the convection heating device 31 has a heating gas return-flow pipe arrangement 34 with a heating gas return-flow main pipe 35, which again runs parallel to the heating medium return-flow main line 23 of the convection heating device 17. Between the heating gas outward-flow pipe arrangement 32 and the heating gas return-flow pipe arrangement 34 in the heating gas flow path there is a convection heating gas pipe arrangement 36 with a plurality of convection heating gas pipes 37 running side by side.

The convection heating gas pipes 37 have passage openings 38 on the shell side in the form of perforation holes through which the heating gas can be guided from the inside of the convection heating gas pipes 37 into the baking space 3.

An at least partial circulation of the heating gas of the convection heating device 31 runs via a heating gas heating unit 39 in the form of, for example, a duct burner or other burner. From there, the heating gas is fed via a corresponding feeding line into the heating gas outward-flow main line 33. The latter is in fluid communication with the right-hand ends of the heating gas pipes 37 in FIG. 4 via the outward-flow stub 25. From there the heating gas flows into the heating gas pipes 37 and at least part of the heating gas flows through the passage openings 38 into the baking space 3. Heating gas which is not discharged from the heating gas pipes 37 via the passage openings 38 leaves the heating gas pipes 37 via the return-flow stub 28 from which the heating gas is guided into the heating gas return-flow main line 35.

The heating units 18 and 39 each have at least one circulation fan 18a, 39a for the heating medium and the heating gas, respectively.

From the heating gas return-flow main line 35, the heating gas flows back to the heating gas heating unit 39 via a corresponding return-flow line so that the heating gas circuit is closed. In addition, the heating unit 39 draws the heating gas directly from the baking space 3, which is illustrated in FIG. 4 via a flow path 40.

The heat exchanger pipes 24 of the heat-exchange heating device 17 on the one hand and the heating gas pipes 37 of the convection heating device 31 on the other hand are accommodated alternately in a pipe package 41 in the once-through baking oven 1, in particular in the respective oven module $2_i$. The pipes of such a pipe package 41 are then alternately provided with passage openings 38 and are closed on the shell side. The direct heating via the heating gas by means of the convection heating device 31 can be performed using convection and/or via gas flow driven by means of a circulation fan, for example the fan 39a.

A throttle element, for example a throttle valve 41a, can be arranged in the region of the heating gas return-flow between the heating gas return-flow main line 35 and the heating gas heating unit 39 for regulating a circulated heating gas quantity. Alternatively or additionally, a circulated heating gas quantity can also be controlled via the circulation fan 39a.

Figure 6:
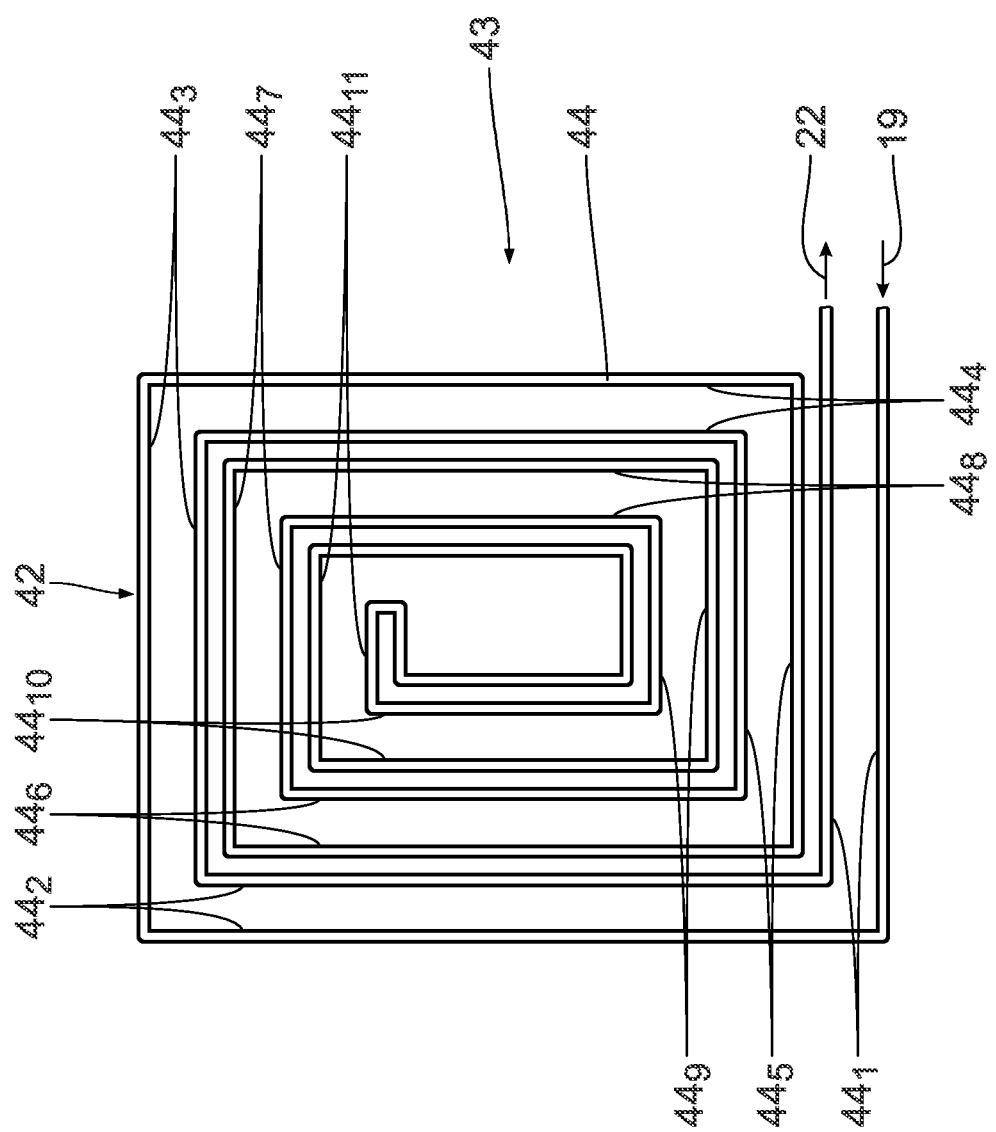
FIG. 6 shows an alternative design of a radiator pipe arrangement of a heat-exchange heating device for the once-through baking oven, wherein a course of the radiator pipe arrangement is spiral or meander-shaped.

With reference to FIG. 6, a further embodiment of a radiator pipe arrangement 42 of a further embodiment of a heat-exchange heating device 43 is described below. Components and functions corresponding to those already explained above with reference to FIGS. 1 to 5 bear the same reference numbers and are not discussed in detail again.

The heat-exchange heating device 43 has a heating medium outward-flow pipe section in the manner of the heating medium outward-flow pipe arrangement 19 and a heating medium return-flow pipe arrangement in the manner of the heating medium return-flow pipe arrangement 22. The intermediate radiator pipe arrangement 42 has a heat exchanger pipe section 44 for guiding the heating medium between the heating medium outward-flow pipe section 19 and the heating medium return-flow pipe section 22 and for indirect heat dissipation to the baking space 3 of the once-through baking oven 1. A course of the radiator pipe arrangement 42 is spiral or meander-shaped in such a way that the heating medium flows in two adjacent heat exchanger pipe sections $44_i$ (i=1 to 11) in opposite flow directions. This is exemplified in the embodiment according to FIG. 6 by means of the heat exchanger pipe sections $44_1$ to $44_{11}$. The number of such adjacent heat exchanger pipe sections $44_i$ can be in the range between 2 and 30, can be larger than 5, can be larger than 10, can be smaller than 30, can be smaller than 25, can be smaller than 20 and can be smaller than 15.

Figure 7:
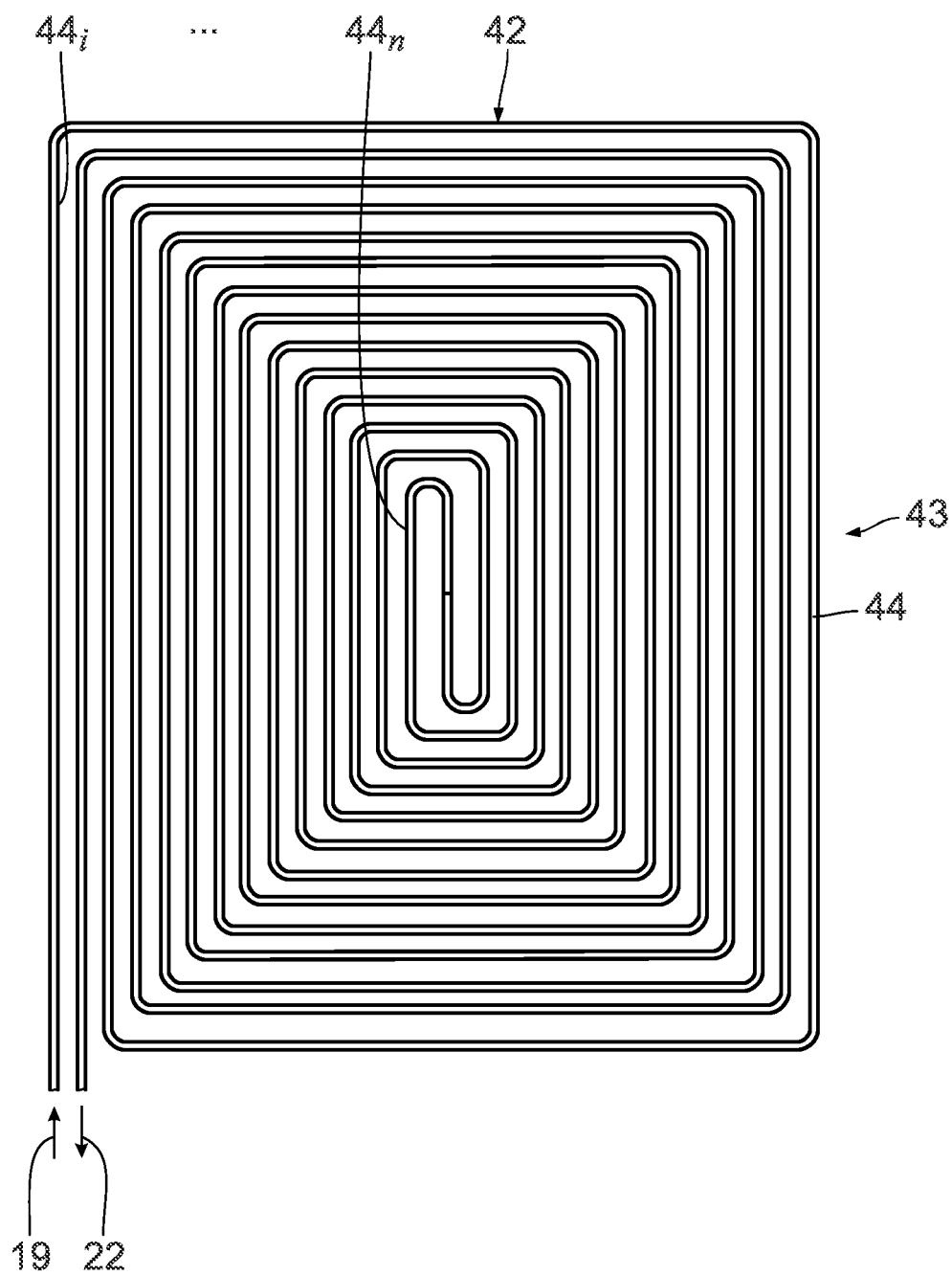
FIG. 7 in a similar illustration to FIG. 6, shows a further spiral or meander-shaped design of a radiator pipe arrangement of a heat-exchange heating device for the once-through baking oven.

FIG. 7 shows another variant of a spiral or meander-shaped radiator pipe arrangement 42 of a heat-exchange heating device 43, which can be used instead of the one explained above with reference to FIG. 6. Components and functions corresponding to those already described above bear the same reference numbers and are not discussed in detail again.

The radiator pipe arrangement 42 according to FIG. 7 has a much larger number of adjacent heat exchanger pipe sections $44_i$ in which the heating medium flows in opposite directions to each other compared to those according to FIG. 6. The heat exchanger pipe sections $44_i$ are approximately equally spaced apart from each other in the embodiment according to FIG. 7. The number of adjacent heat exchanger pipe sections $44_i$ is larger than 25 in the radiator pipe arrangement 42 according to FIG. 7.

The heating units 18, 39 including their circulation fans as well as the described flaps are connected with a central control/regulating device 45 of the once-through baking oven 1, which is shown schematically in FIG. 1. In the usual manner, this control/regulating device 45 has a display and operating elements for entering functional parameters and for selecting operating programs of the once-through baking oven. The control/regulating device 45 can be used in particular to specify a temperature zone progression for the baking material along the baking material conveying direction F in the baking space 3. The various heating devices 17, 31, 43 can be controlled or regulated or operated independently of one another via the control/regulating device.

For regulated operation, the once-through baking oven has sensors for measuring, in particular, the temperature of the once-through baking oven along the baking oven conveying direction F. Furthermore, sensors can be present for measuring a circulated quantity of the heating medium or the heating gas. Further sensors can measure temperatures at selected pipe sections of the pipe arrangement discussed above.

A temperature regulation zone along the baking material conveying direction F can have a length which is a maximum of 18 m and which can also have a smaller extension, for example 15 m, 12 m, 10 m, 8 m, 6 m or 3 m.

The once-through baking oven 1 can be designed with a steam system.

The once-through baking oven 1 can have an automatic steam quantity regulation. The once-through baking oven 1 can have an adjustable steam fan for steam extraction.

The radiator pipe arrangements described above, in particular the pipe packages, can be designed as separately prefabricated assemblies that can be connected to the other components of the once-through baking oven 1, for example via screw connections and/or via welded connections.

A cross-section of the pipes used for the pipe arrangements described above can be round, but can also deviate from a round shape in sections or as a whole. For example, a trapezoidal pipe cross-section can be used.

The invention claimed is:

1. A baking oven for continuous baking operation, comprising:
    a baking space;
    a plurality of oven modules with module baking space sections which together form the baking space between an initial oven module of the plurality of oven modules leading in a baking material conveying direction and a final oven module of the plurality of oven modules in the baking material conveying direction;
    a baking material conveying device for continuously conveying baking material between the initial oven module and the final oven module in the baking material conveying direction;
    a heat-exchange heating device for indirect heating of the baking space via a free-flowing heating medium;
    a convection heating device for direct heating of the baking space via a heating gas,
    wherein the heat-exchange heating device has:
        a heating medium outward-flow pipe arrangement,
        a heating medium return-flow pipe arrangement, and
        at least one intermediate radiator pipe arrangement having a plurality of heat exchanger pipes running side by side for indirect heat dissipation to the baking space, wherein the plurality of heat exchanger pipes each guide the heating medium between the heating medium outward-flow pipe arrangement and the heating medium return-flow pipe arrangement,
    wherein the heating medium outward-flow pipe arrangement, the heating medium return-flow pipe arrangement, and the at least one intermediate radiator pipe arrangement are designed in such a way that the heating medium in two adjacent ones of the plurality of heat exchanger pipes flows in opposite flow directions to each other, and
    wherein the convection heating device has:
        a heating gas outward-flow pipe arrangement,
        a heating gas return-flow pipe arrangement, and
        at least one intermediate convection heating gas pipe arrangement having a plurality of convection heating gas pipes running side by side, via each of which the heating gas flows directly into the baking space.

2. The baking oven according to claim 1, wherein the at least one intermediate radiator pipe arrangement is designed in such a way that the heating medium in all adjacent ones of the plurality of heat exchanger pipes flows in opposite flow directions to each other.

3. The baking oven according to claim 1, wherein the heat exchanger pipes of the respective intermediate radiator pipe arrangement are designed as a pipe package with pipes of the same length.

4. The baking oven according to claim 1, wherein at least one of the heating medium outward-flow pipe arrangement and the heating medium return-flow pipe arrangement have a main line from which stubs extend to the plurality heat exchanger pipes, wherein the main line extends parallel to a longitudinal extension of the heat exchanger pipes of the at least one intermediate radiator pipe arrangement.

5. The baking oven according to claim 1, wherein the heating medium outward-flow pipe arrangement and the heating medium return-flow pipe arrangement each have two stubs which run transversely to a longitudinal extension of the plurality of heat exchanger pipes and are in fluid communication with spatially opposite ends of the heat exchanger pipes of the at least one intermediate radiator pipe arrangement.

6. The baking oven according to claim 1, wherein the at least one intermediate radiator pipe arrangement of the heat-exchange heating device is designed as at least one of a top heat arrangement and a bottom heat arrangement.

7. A baking oven for continuous baking operation, comprising:
    a baking space;
    a plurality of oven modules with module baking space sections which together form the baking space between an initial baking oven module of the plurality of oven modules leading in a baking material conveying direction and a final oven module of the plurality of oven modules in the baking material conveying direction;

a baking material conveying device for continuously conveying baking material between the initial baking oven module and the final oven module in the baking material conveying direction;

a heat-exchange heating device for indirect heating of the baking space via a free-flowing heating medium; and a convection heating device for direct heating of the baking space via a heating gas, wherein the heat-exchange heating device has:
- a heating medium outward-flow pipe section,
- a heating medium return-flow pipe section, and
- at least one intermediate radiator pipe arrangement with having a plurality of heat exchanger pipes for guiding the heating medium between the heating medium outward-flow pipe section and the heating medium return-flow pipe section and for indirect heat dissipation to the baking space,
- wherein a course of the at least one intermediate radiator pipe arrangement is at least one of spiral and meander-shaped such that the heating medium in two adjacent heat exchanger pipes of the plurality of heat exchanger pipes flows in opposite flow directions to each other, and wherein the convection heating device has:
- a heating gas outward-flow pipe arrangement,
- a heating gas return-flow pipe arrangement, and
- at least one intermediate convection heating gas pipe arrangement having a plurality of convection heating gas pipes running side by side, via each of which the heating gas flows directly into the baking space.

8. The baking oven according to claim 1, wherein the plurality of heat exchanger pipes of the heat-exchange heating device and the convection heating gas pipes of the convection heating device form a pipe package.

9. The baking oven according to claim 1, wherein the plurality of convection heating gas pipes have a plurality of passage openings, for guiding the heating gas into the baking oven.

\* \* \* \* \*